United States Patent

Humphrey, Jr. et al.

[15] 3,699,950
[45] Oct. 24, 1972

[54] FLEXIBLE OPTICAL LIGHT PIPES USED FOR SURGERY

[72] Inventors: William G. Humphrey, Jr.; Michael L. Rishton, both of Reading, Mass.

[73] Assignee: Dyonics Inc., Woburn, Mass.

[22] Filed: July 2, 1970

[21] Appl. No.: 51,883

[52] U.S. Cl. ............128/23, 285/242, 285/284, 285/DIG. 16, 285/114
[51] Int. Cl. ........A61b 1/06, F16l 13/00, F16l 33/00
[58] Field of Search............128/6, 7, 8, 9, 11, 13, 16, 128/18, 22, 23; 285/174, 238, 239, 242, 254, 284, 297, DIG. 16; 350/96 B

[56] References Cited

UNITED STATES PATENTS

| | | | |
|---|---|---|---|
| 3,423,581 | 1/1969 | Baer | 350/96 B |
| 3,457,000 | 7/1969 | Genähr | 350/96 B |
| 3,518,666 | 6/1970 | Heggestad | 350/96 B |
| 2,086,276 | 7/1937 | Lindas | 285/284 X |
| 2,410,162 | 10/1946 | Horan | 285/174 |
| 3,314,696 | 4/1967 | Ferguson et al. | 285/174 |
| 3,455,625 | 7/1969 | Brumley et al. | 350/96 B |
| 3,357,423 | 12/1967 | Winchester et al. | 128/23 |
| 3,498,826 | 3/1970 | Caroselli et al. | 350/96 B UX |

*Primary Examiner*—Channing L. Pace
*Attorney*—John Noel Williams

[57] ABSTRACT

Flexible fiber optic light pipes. In the form of an autoclavable surgical light pipe, a protective sheath formed by a single tube of silicone rubber has a critical outer diameter at least 2¼ times the internal diameter, the outer diameter on the order of 8 mm. Such a tube has a self-limiting effect, resisting bending of itself so that the fibers are not bent to their critical angle for breakage. A sealing coating on the fibers prevents adverse effects attributable to moisture passing through the wall thickness of the tube while end sealing prevents wash-off of the coating. An end sealing arrangement is shown with end cap and ferrule gripping the thickness of the tube, forming a gasket seal. Correspondingly tapered, butted and bonded surfaces align the assembly and provide a uniform seal. An inextensible cord-like member in the bore, extending between the ferrules, resists extension of the elastomeric outer tube.

15 Claims, 6 Drawing Figures

PATENTED OCT 24 1972 3,699,950

PATENTED OCT 24 1972 3,699,950
2 Sheets-Sheet 2
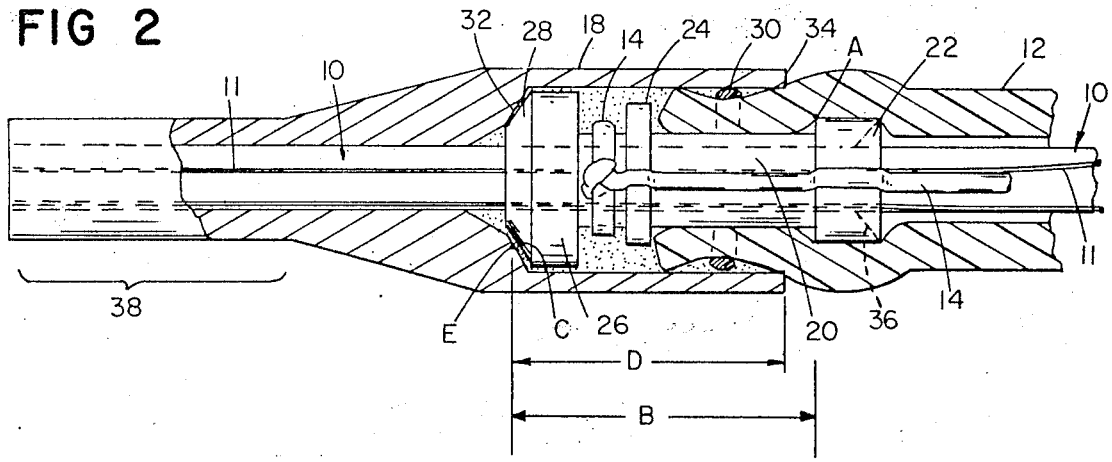
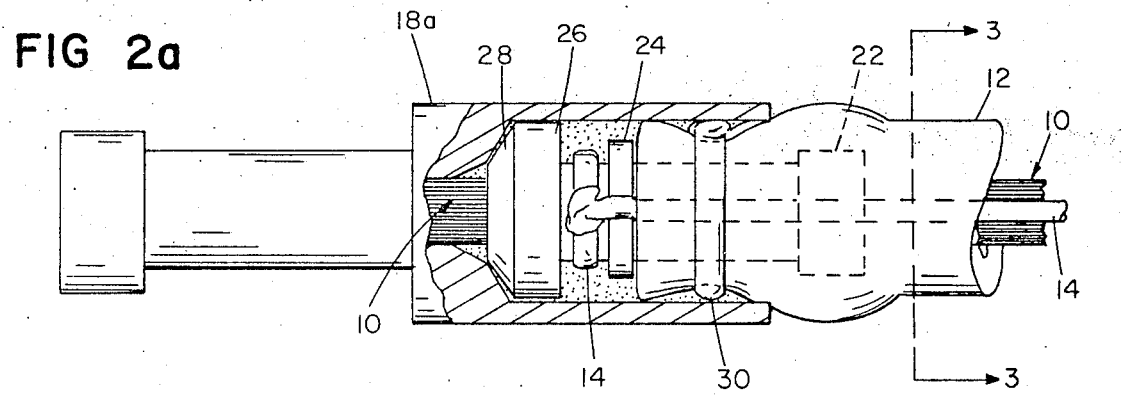
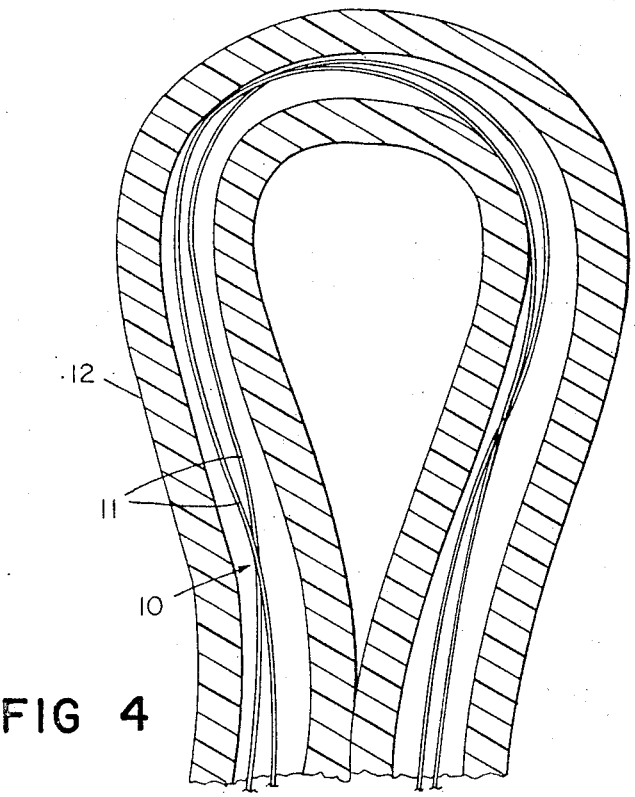
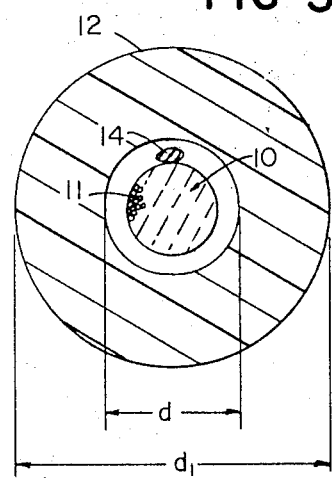

FLEXIBLE OPTICAL LIGHT PIPES USED FOR SURGERY

This invention relates to flexible fiber optic pipes and in particular to light pipes suitable for illuminating wounds and incisions during a surgical procedure.

Surgical light pipes are used during surgical procedures and must be cleaned after every use to maintain sterility. A typical method of cleaning surgical equipment is by washing in water followed by steam autoclaving.

A constraint upon the design of surgical equipment is the requirement that ordinary cleaning techniques be adequate to remove blood and tissue that may become attached thereto. This makes it highly desirable that there be no crevices or other irregularities from which blood or tissue particles would be difficult to remove.

A prevalent problem with prior light pipes which were used as adjuncts to surgical procedures was their inability to withstand repeated steam autoclaving. Typical failures of such items included pulling apart or separation of the components of the light pipe and breakage of the fibers.

Light pipes for other uses have similar problems when exposed to similar conditions. These problems have in the past lead to failure where elastomeric sheaths alone were employed, it being thought necessary to provide a second tubular strengthening member within the elastomeric tube.

It is therefore a principal object of the invention to provide an improved light pipe construction, and one which may be readily cleaned by ordinary techniques and which will withstand repeated steam autoclaving.

As will be apparent from the description of a preferred embodiment of a light pipe constructed according to the invention herein, the successful provision of an improved light pipe requires the resolution of a number of apparently conflicting factors, reflected by the material employed at various locations in the structure and even small details of component design. This being the case, a consideration at this point of some of the constraints and limitations bearing upon the construction of a surgical light pipe will aid in the understanding of the detailed description presented below.

There are severe limitations on light pipe size. If two light pipes are to be located within 2 or 3 inches from the incision, along with the surgeon's knife and numerous retractors and other appliances, it becomes apparent that the light pipe must be small. Indeed, increase by only a small fraction of an inch in diameter can prevent a light pipe from being acceptable to surgeons. Another severe limitation arises from the fact that the nurse must be able to hold the light pipe for a very long time during an operation, which dictates flexibility and smallness in size.

There are equally severe requirements tending in the opposite direction with regard to size. For instance, with respect to light transmitting capability, in order to make use of light pipes worthwhile as an adjunct to overhead lighting they must improve considerably the already well lighted operating table. Accordingly each pipe must transmit a great amount of light, which dictates a large cross-sectional area. The requirement for continuing good light properties also tends to dictate increase in cross-sectional size. The brittle (though to a degree flexible) fibers must be protected from breakage, and the optical surfaces at the ends of the light pipe must be preserved, as broken fibers or marred optical surfaces will not transmit the needed light.

The means by which fiber breakage occurs include undue overall bending of the bundle, undue tension, and undue abrasion of the fibers.

Another means by which fibers break is that, although the overall bend of the bundle is not beyond a safe limit, still individual fibers, during a bend, tend to be forced into a longer than permissible path, resulting in tension beyond the breaking point. To combat this, cross-sectional space must be provided either for simply allowing the fibers to shift relative to one another, to prevent the path of any one from being forced to be too long, or for special configurations of the fibers for similarly counteracting this tendency.

With regard to the optical surfaces, these are made by bonding the fibers together with epoxy cement, after which the excess length of the bundle is cut away and the surface is cut and polished to provide the optical surface. This epoxy, under the heating conditions of the pressurized autoclave is often near its softening temperature and is susceptible to disturbance. Other factors besides those mentioned further complicate the problem of achieving a long reuseable and simple surgical light pipe and the like.

In one aspect the invention features a surgical light pipe construction having a single protective sheath member in the form of a tube of silicone rubber, the tube having a critical wall thickness defined by the outer diameter of the tube being at least 2¼ times the inner diameter of the tube, the outer being on the order of 8 mm; by this provision the tube wall thickness serves to limit its own bending, effectively preventing bending of the fibers within the tube beyond their critical bend angle. Also featured in this construction is a sealant coating on the fibers which prevents moisture effects on the fibers despite inherent moisture permeability of silicone rubber while the end members seal against a flow of water that might otherwise wash away the sealant coating.

Another aspect of the invention features end assemblies formed of rigid end caps and ferrules gripping the thickness of the elastomeric tubing to form a gasket seal. Preferably matching tapered surfaces of ferrule and cap assure centering and a uniform gasket seal about the periphery of the tube, the tapered surfaces being bonded together. Also featured is a non-extensible cord-like member secured to the ferrules serving to limit distension of the light pipe.

With the foregoing in mind, other objects, features and advantages will be apparent from the following description of a preferred embodiment, taken together with the attached drawings thereof, in which:

FIG. 2 is an axial cross section of a portion of the light pipe of FIG. 1 showing the details of construction at one of the ends thereof;

FIG. 2a is likewise another axis cross section of a portion of the light pipe of FIG. 1 showing the details of construction at the opposite end of the light pipe.

FIG. 3 is a transverse cross-section on a magnified scale of the light pipe of FIGS. 1 and 2 taken on line 3—3;

FIG. 4 is a longitudinal cross-section of a portion of the light pipe subjected to bending-double conditions.

Figure 1:
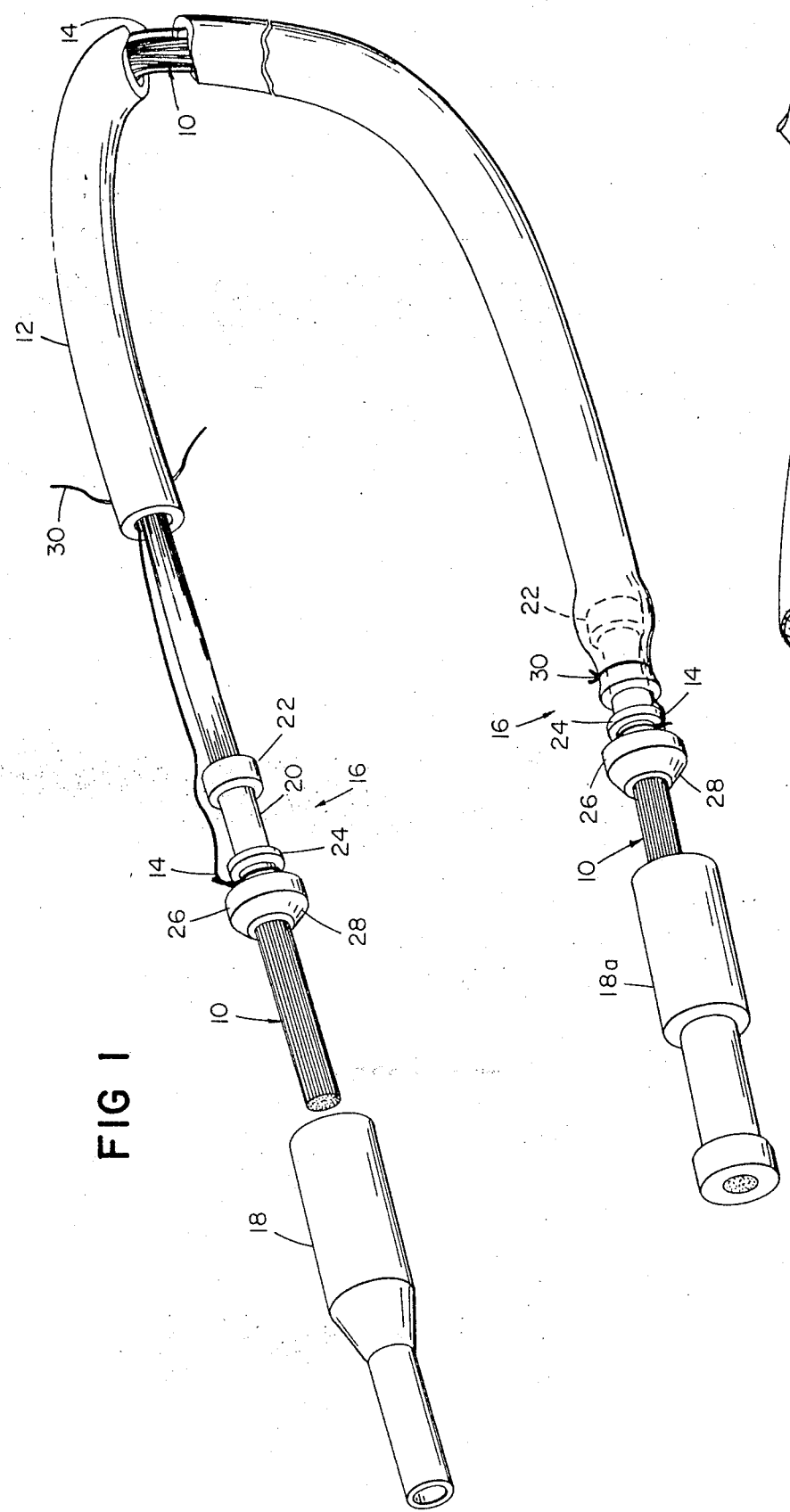
FIG. 1 is an exploded and partially broken-away view of a surgical light pipe constructed according to the invention.
Figure 5:
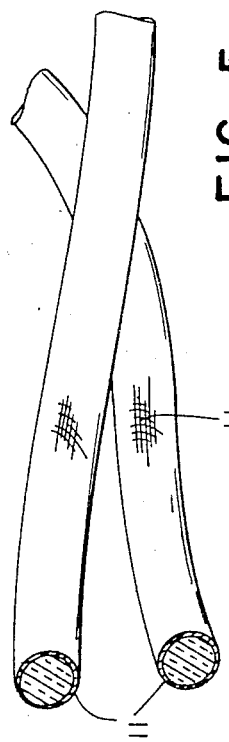
FIG. 5 is a highly magnified perspective view, partly in cross-section, of fibers employed in the light pipe of FIGS. 1 and 2.

Referring to FIGS. 1 and 2 a bundle of conventional flexible light pipe glass fibers 10 is loosely disposed in elastomeric tube 12 comprised of silicone rubber. As best shown in FIG. 3 the OD, $d_1$, of the tube 12 is greater than 2¼ times the ID, $d$; that is the wall thickness on each side is greater than about 60 percent of the internal diameter of the tube. In the preferred form each of the individual fibers is approximately 0.002 inch in diameter. If the tube is bent double FIG. 4 (without applying unusual pressure at the bend) the substantial thickness of the tube walls limits the bend of the tube to a radius of curvature less than that at which the fibers break (critical radius of curvature for 0.002 inch diameter of ordinary glass optic fibers is determined to be on the order of one-fourth inch). It is realized that a silicone oil (Dow-Corning) coating 13 (FIG. 5) over the exterior surface of the fibers can serve the purpose of sealing the fibers against the effects of moisture and serving as a surface anti-wetting agent (as well as lubricating the fibers so they slip relative to one another). This is found to be important because silicone rubber is permeable to moisture. Small quantities of water absorbed by the glass fiber, as when the unit is autoclaved, increases their brittleness significantly and water adsorbed tends to make the fibers cling rather than shift freely relative to one another.

This coating thus cooperates to make it possible to use the single tubular sheath being described with its attendant simplicity.

Instead of being harmful, the porosity of the tubular wall to water vapor now is seen to provide a benefit as a means for pressure relief when there is a differential in pressure between the outside and inside of the tube as when the unit is suddenly removed from the pressure of the steam autoclave. Thus the epoxy of the end faces is saved from a long duration pressure differential which tends to harm the hot epoxy.

In this preferred embodiment a cord-like member 14 is disposed within the casing member 12 and is attached to ferrules 16 at either end of the light pipe. It is realized that with this configuration, contact of the cord with the individual fibers of the bundle 10 can introduce a tendency to breakage of the fibers, but it is also realized that use of a cord-like member 14 which is non-abrasive and even self-lubricating meets this problem. A suitable member 14 has been found to be a braided preshrunk ribbon of polytetrafluoroethylene (hereinafter referred to by the name of Teflon, a trademark registered in the U.S. Pat. Office to E. I. DuPont de Nemoirs and Company, Inc., a corporation of Delaware. In addition to being non-abrasive and self-lubricating, the cord 14 has adequate strength and inextensibility to serve the primary function of preventing excessive tension from being applied to the fiber bundle 10 so as to prevent breakage of the fibers in the bundle or pulling apart of the various components. In addition, the choice of Teflon as the material for member 14 results in a tension limiting structure which is capable of withstanding repeated subjection to elevated temperatures during a steam autoclaving procedure.

End caps 18, 18a are provided at both ends of the light pipe. The fiber bundle 10 and each ferrule 16 is bonded to the interior of each end cap 18 and the end cap and ferrule are related to the casing as described in detail below.

As best seen in FIG. 2, each ferrule 16 comprises a shaft portion 20, flange portions 22 and 24, and a head portion 26 which includes frustoconical portion defined by surface 28. The diameter of flange portion 22 is chosen such that it is somewhat larger than the internal diameter of the elastomeric casing member 12, thereby producing a stretch fit of the casing member 12 over the flange 22 when the former is fitted over the ferrule 16 as shown in FIG. 2. The casing member 12 is then secured to the ferrule 16 by means of a braided nylon tie member 30 beyond of flange 22.

The Teflon cord 14 also passes over the flange 22, but extends beyond the tie member 30 and the end of the casing member 12 and is tied in the annular channel formed between the flange 24 and the head portion 26 of the ferrule 16. Flange 24 thus provides a firm anchor at each end of the cord 14.

The end caps 18 and 18a are hollow and are sized to receive the ferrule 16 in one end and are reduced in size to receive only the fiber bundle 10 at the tip as shown in FIGS. 2 and 2a. The construction of the end cap 18 and the ferrule 16 is such that, when the surface 28 of the head portion 26 of ferrule 16 is immediately adjacent a matching interior surface 32 of end cap 18, the portion of elastomeric casing member 12 between flange 22 and the end 34 of end cap 18 will be firmly gripped in a gasket-like seal between flange point A and the inner edge of cap end 34. This relationship is provided by the dimension B, between flange 22 and ferrule point C (closest to the abutting surface E of the cap), being greater than dimension D but less than dimension $D + t$, $t$ being the thickness of the tube and D being the distance between abutting surface E of the cap and end 34 of the cap.

The frustoconical surface 28 of the ferrule and the mating surface 32 of the end cap 18 produce a self-centering feature for the ferrule. This is important to assure a uniform gasket-like gripping of the casing member 12 about its entire circumference in the region of flange 22 and end portion 34 of the end cap 18. Furthermore, matching surfaces 28 and 32 provide convenient surfaces for bonding the ferrule to the end cap, since many bonding materials (including epoxy) produce best results if the surfaces to be adhered have a small separation and have a generous mating surface area.

The ferrule 16 is adhered to the end cap 18 (in the region of the head portion 26) and the fiber bundle 10 is adhered to the distal extension 38 of end cap 18.

It should be noted, that the flange portion 22 has a relieved surface 36 at the region where the fiber bundle 10 enters the ferrule 16. This construction prevents breakage of the individual fibers on a sharp edge of the ferrule 16 if the light pipe is twisted or bent.

Although the two end caps 18 and 18a have somewhat differing external appearances, (see FIG. 1) due to their differing functions, the internal structure of both is nearly identical as illustrated in FIG. 2 and FIG. 2a.

From the foregoing it will be seen that various features cooperate with one another to provide improved results, while overall, the set of features cooperate to achieve the objects of the invention.

Other embodiments of the invention herein will occur to those skilled in the art and are within the following claims.

What is claimed is:

1. A surgical light pipe comprising in combination a single tube and a bundle of flexible light conducting fibers therewithin, said tube being comprised of silicone rubber and having an outer diameter more than 2¼ times the size of the inner diameter, said outer diameter being on the order of 8mm, said flexible light-conducting fibers loosely disposed within and directly exposed to the inner bore of said tube, a sealant coating on said glass fibers excluding moisture permeating the walls of said tube from being absorbed and adsorbed by said glass fibers while permitting slippage of contacting fibers relative to one another, and end members having openings in which said glass fibers are disposed, aligned ends of said glass fibers defining optical light transmitting end faces, said end members forming seals with said fibers and said tube against the flow of water into said tube.

2. The surgical light pipe of claim 1 wherein said sealant coating comprises silicone oil.

3. The surgical light pipe of claim 1 wherein said end members are comprised of end caps and ferrules, each ferrule having an enlarged portion gripping the tube against a surface of said end cap for forming a said seal between said end member and said tube.

4. The surgical light pipe of claim 3 wherein said ferrule has a tapered surface, said end cap defining a matching internal surface against which said ferrule surface is bonded in a self-centered relationship.

5. The surgical light pipe of claim 1 wherein said flexible fibers are on the order of 0.002 inch diameter.

6. The surgical light pipe of claim 1 wherein an inextensible cord-like member extends through the bore of said tube and is secured to opposite end members, resisting elongation of said light pipe.

7. In a light pipe comprising, in combination, a bundle of flexible, light-conducting fibers; a smooth outer-surface elastomeric tube directly surrounding said bundle of fibers and providing a smooth surface to said light pipe; at each end of the light pipe a rigid cap secured thereto, the ends of fibers of said bundle adhered together with bonding material and each end of said bundle bonded to the inside of the respective rigid cap; the improvement comprising a pair of ferrules, each having one end within a respective cap said end butted against a mating surface of said end cap, and bonded thereto; each ferrule having a flange which said elastomeric tube overlies and which cooperates with said rigid cap to grip said elastomeric tube in a substantially leak-proof manner.

8. A light pipe comprising, in combination, a bundle of flexible, light-conducting fibers; a smooth outer-surface elastomeric tube directly surrounding said bundle of fibers and providing a smooth surface to said light pipe; at each end of the light pipe a rigid cap secured thereto, the ends of fibers of said bundle adhered together with bonding material and each end of said bundle bonded to the inside of the respective rigid cap; a pair of ferrules, which extend at least partially within each of said rigid caps, respectively, and which are secured thereto; each ferrule having a flange which said elastomeric tube overlies and which cooperates with said rigid cap to grip said elastomeric tube in a substantially leak-proof manner; and a relatively inextensible cord-like member within said elastomeric tube which is secured to and extends between said ferrules.

9. The light pipe of claim 8 wherein each ferrule is provided with a second flange, said cord-like member being tied around the shaft of said ferrule on the side of said second flange opposite said first flange.

10. The light pipe of claim 8 wherein said cord-like member comprises a braided ribbon of polytetrafluoroethylene.

11. The light pipe of claim 7 wherein said elastomeric tube is secured to the shaft of each ferrule.

12. The light pipe of claim 11 wherein said elastomeric tube is tied to each ferrule with a tie member.

13. The light pipe of claim 8 wherein each ferrule has a tapered end and each rigid cap is internally tapered to match the taper of said ferrule end; whereby said ferrule is self-centering within said rigid cap, thereby creating a uniform gasket-like seal where said flange and said rigid cap cooperate to grip said elastomeric tube.

14. The light pipe of claim 13 wherein each ferrule is secured to the respective rigid cap by means of epoxy material which bonds said ferrule to said rigid cap at least over the area of said tapered end.

15. The light pipe of claim 14 wherein an extension of each said end cap extends outwardly from the respective ferrule, closely surrounding said bundle of fibers and epoxy material bonds the ends of said fibers together and the ends of said bundles to the inside of said extensions of said rigid caps.

* * * * *